United States Patent
Liang et al.

(10) Patent No.: US 9,055,553 B2
(45) Date of Patent: Jun. 9, 2015

(54) METHOD FOR GUARANTEEING ESTABLISHMENT OF LOCAL IP ACCESS CORRECTLY

(75) Inventors: Huarui Liang, Beijing (CN); Hong Wang, Beijing (CN); Lixiang Xu, Beijing (CN)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 559 days.

(21) Appl. No.: 13/441,616

(22) Filed: Apr. 6, 2012

(65) Prior Publication Data

US 2012/0258767 A1 Oct. 11, 2012

(30) Foreign Application Priority Data

Apr. 8, 2011 (CN) .......................... 2011 1 0091224

(51) Int. Cl.
*H04W 40/00* (2009.01)
*H04M 1/00* (2006.01)
*H04W 4/00* (2009.01)
*H04W 76/00* (2009.01)
*H04W 8/22* (2009.01)

(52) U.S. Cl.
CPC ............... *H04W 76/00* (2013.01); *H04W 8/22* (2013.01)

(58) Field of Classification Search
CPC ................................. H04W 84/005
USPC ................... 455/445; 370/328, 338
See application file for complete search history.

(56) References Cited

U.S. PATENT DOCUMENTS

| 8,504,023 | B2 * | 8/2013 | Zhu ............................ 455/432.3 |
| 8,626,174 | B2 * | 1/2014 | Mukherjee .................... 455/445 |
| 8,837,369 | B2 * | 9/2014 | Chen et al. .................... 370/328 |
| 2010/0272013 | A1 * | 10/2010 | Horn et al. .................... 370/328 |
| 2011/0045826 | A1 * | 2/2011 | Kim et al. .................. 455/426.1 |

OTHER PUBLICATIONS

International Search Report dated Oct. 31, 2012 in connection with PCT Patent Application No. PCT/KR2012/002512.
Written Opinion of International Searching Authority dated Oct. 31, 2012 in connection with PCT Patent Application No. PCT/KR2012/002512.
3GP TS 22.220 V11.1.0 (Mar. 2011), "3rd Generation Partnership Project; Technical Specification Group Services and System Aspects; Service requirements for Home Node B (HNB) and Home eNode (HeNB) (Release 11)", Mar. 2011, 25 pages.

* cited by examiner

*Primary Examiner* — Tilahun B Gesesse

(57) ABSTRACT

A method for guaranteeing correct establishment of Local IP Access service includes: obtaining the service type of a user equipment (UE) and the equipment capability type of a base station. The method also includes determining whether the UE and the base station are consistent. The method also includes, in response to determining that the UE and the base station are consistent, establishing LIPA service for the UE. The method also includes, in response to determining that the UE and the base station are inconsistent, deciding whether to establish LIPA service for the UE according to the preserved strategy.

22 Claims, 14 Drawing Sheets

METHOD FOR GUARANTEEING ESTABLISHMENT OF LOCAL IP ACCESS CORRECTLY

CROSS-REFERENCE TO RELATED APPLICATION(S) AND CLAIM PRIORITY

The present application is related to and claims priority under 35 U.S.C. §119 to an application filed in the State Intellectual Property Office of China on Apr. 8, 2011 and assigned Serial No. 201110091224.4, the contents of which is incorporated herein by reference.

TECHNICAL FIELD OF THE INVENTION

The present invention relates to wireless communication technology, especially to a method for guaranteeing the correct establishment of Local IP Access (LIPA) service.

BACKGROUND OF THE INVENTION

FIG. 1 is the system diagram of System Architecture Evolution (SAE), thereby, User Equipment (UE) 101 is terminal equipment used to receive data. Evolved Universal Terrestrial Radio Access Network (E-UTRAN) 102 is a wireless access network, including macro base station (eNodeB/NodeB) that provides wireless access network interface for a UE. A Mobile Management Entity (MME) 103 is in charge of managing mobile context, session context and security information of UE. A Service Gateway (SGW) 104 mainly provides the functions for user plane. The MME 103 and SGW 104 can be in the same physical entity. A Packet data network Gateway (PGW) 105 is in charge of functions such as billing, lawful interception, and the like, and can be in the same physical entity as SGW 104. Policy Charging and Rules Function (PCRF) 106 provides policy for Quality of Service (QoS) and billing rules. Serving General Packet Radio Service (GPRS) Support Node (SGSN) 108 is the network node equipment providing routing for the data transmission in Universal Mobile Telecommunications System (UMTS). Home Subscriber Server (HSS) 109 is the home ownership subsystem of UE, which is in charge of protecting the user information including, current position of user equipment, the address of service node, user security information, packet data of user equipment, and so forth.

It is proposed in 3GPP that the network needs to be capable of supporting local Internet Protocol access (LIPA). LIPA means that UE access the home network or enterprise internal network through Home eNodeB (HeNB) or Home NodeB (HNB), when executing LIPA, select or reselect the user plane node near the HNB or select the user plane node located in HeNB/HNB access network for UE. Among them, a user plane node can be core network equipment or a gateway. For SAE system, a user plane node can be SGW or PGW or Local Gateway (LGW). For UMTS system, a user plane node can be SGSN or Gateway GPRS Support, Node (GGSN).

At present, LIPA does not support mobility in 3GPP Release-10 (referred to as R10 hereinafter). When the UE moves out of HeNB/HNB supporting LIPA, all services related to LIPA of this UE are terminated. In R10, this HeNB/HNB and LGW are designed in the same physical entity.

LIPA supports mobility in 3GPP Release-11 (referred to as R11 hereinafter). When the UE moves out of HeNB/HNB supporting LIPA, and only when the UE is still in the enterprise network or home network, it is required that LIPA service of the UE cannot be terminated. In R11, individual LGW and HeNB/HNB are defined, HeNB/HNB and LGW are not designed in the same physical entity, and an open interface between the two entities will be defined.

At present, the biggest difference between LIPA service in R11 and LIPA service in R10 is: LIPA service in R11 supports mobility while LIPA service in R10 does not support mobility; LIPA service in R11 supports multiple PDN connections and multiple bearer requests while LIPA service in R10 only supports single PDN connection and single bearer request.

With the introduction of new function and new node in R11, in a R11 network, it may happen that R10 equipment node and R11 equipment node coexist. FIG. 2a shows a kind of LTE network structure in which the core network node MME in R11 connects to both HeNB supporting LIPA function in R10 and HeNB supporting LIPA function in R11 at the same time. FIG. 2b shows a kind of UMTS network structure in which SGSN connects to HNB supporting LIPA function in R10 and HNB supporting LIPA function in R11 through HNB GW at the same time. For an enterprise network, it may also happen that R10 equipment and R11 equipment coexist. It results in the fact that subscription information of UE may be inconsistent with the capability of access equipment, so it is not guaranteed that LIPA service can be established correctly. For example, the UE signs up for R10 service, but is accessed to HeNB supporting LIPA in R11; or the UE signs up for R11 service, but is accessed to HeNB supporting LIPA in R10; under these situations, since network node does not know equipment capability of the HeNB that UE accesses, the network service connection process may lead to LIPA service failure or incorrect success (like establishing LIPA service in R11 for the user signing up for R10 service), and result in a bad service experience for the user. The user does not know the deployment of network usually, but only knows the service type signed up with the operator.

FIG. 3 provides the network structure of R11 LIPA. The interface between HeNB and LGW is SL interface, the protocol stack supported by this interface has two possibilities currently: possibility 1: SL interface supports both GTP-C and GTP-U protocol at the same time; possibility 2: SL interface supports GTP-U protocol. What is needed is a solution to these two possible structures respectively.

SUMMARY OF THE INVENTION

To address the above-discussed deficiencies of the prior art, it is a primary object to provide a method for guaranteeing correct establishment of LIPA service, so that the network can satisfy the user service request maximally and optimal network resource distribution.

A technical scheme of the present invention is: a method for guaranteeing LIPA service establishment correctly, that includes: obtaining service type of UE and equipment capability type of the base station, determining whether the two are consistent, if true, establishing LIPA service for the UE; if false, according to the preserved strategy, deciding whether to establish LIPA service for the UE.

The method of determining whether to establish LIPA service for the UE according to the preserved strategy when the judging result is that the two are inconsistent includes: when the judging result is inconsistent, reject to establish LIPA service for the UE according to the preserved strategy; or when service type of UE is lower than equipment capability type of the base station, according to the preserved strategy, establishing LIPA service matching with the service type of UE for the UE on the basis of establishing process matching with equipment capability type of the base station, when the service type of UE is higher than the equipment capability type of base station, establishing LIPA service matching with the service type of UE or the equipment capability type of base station for the UE according to the preserved strategy.

When the service type of the UE is higher than the equipment capability type of base station, the establishing LIPA service matching with the service type of UE for UE further includes: establishing single tunnel of LIPA service for the UE;

When the service type of UE is higher than the equipment capability type of base station, after establishing LIPA service matching with the equipment capability type of base station for UE, further includes: marking the degradation of UE service type in the context information of the UE.

The method for obtaining service type of UE being: MME receiving subscription information of UE, and obtaining the service type of UE according to this subscription information; the method for obtaining equipment capability type of base station being: MME receiving the information that carries equipment capability type of base station from base station, and obtaining the equipment capability type of base station according to this information.

When the judging result is inconsistent, the MME further notifies base station of the service type of UE; when the UE requests handover, base station determining whether to execute handover for the UE according to the service type of UE.

The method for obtaining the service type of UE being: MME receiving the subscription information of UE, obtaining the service type of UE according to this subscription information, sending the information carrying service type of the UE to base station, and base station obtaining service type of the UE according to this message.

The above said method further includes: in the UE handover process, MME obtaining the service type of UE and the equipment capability type of base station, when the service type of UE is R10 LIPA, MME deactivating the bearer supporting LIPA service; when the service type of UE is R11 LIPA, and the equipment capability type of base station is R11 LIPA, MME executing handover for the UE; when the service type of UE is R11 LIPA, and the equipment capability type of base station is R10 LIPA, MME determining whether to execute handover for the UE according to the prescribed strategy.

When the service type of UE is higher than the equipment capability type of base station, the establishing LIPA service matching with the equipment capability type of base station for UE further comprising: when UE executes handover, deactivating the bearer supporting LIPA service.

The subscription information of UE carrying information of the service with type of R10 LIPA or R11 LIPA supported by UE; the method future comprising: MME saving the service type and actual established service type of the UE.

It can be seen from the above technical scheme that, in the method provided by the present invention, a judging process is added before judging whether to determine that LIPA service is established successfully, and determines whether a LIPA service is established successfully according to capability information of access equipment and subscription information of UE and operator strategy. Guarantee the user's service experience and network resource optimization maximally.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 4A through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

In order to make object, technical scheme and advantages of the present invention clearer and easier to understand, the present invention will be further illustrated in detail with reference to the drawings and embodiments.

Figure 1:
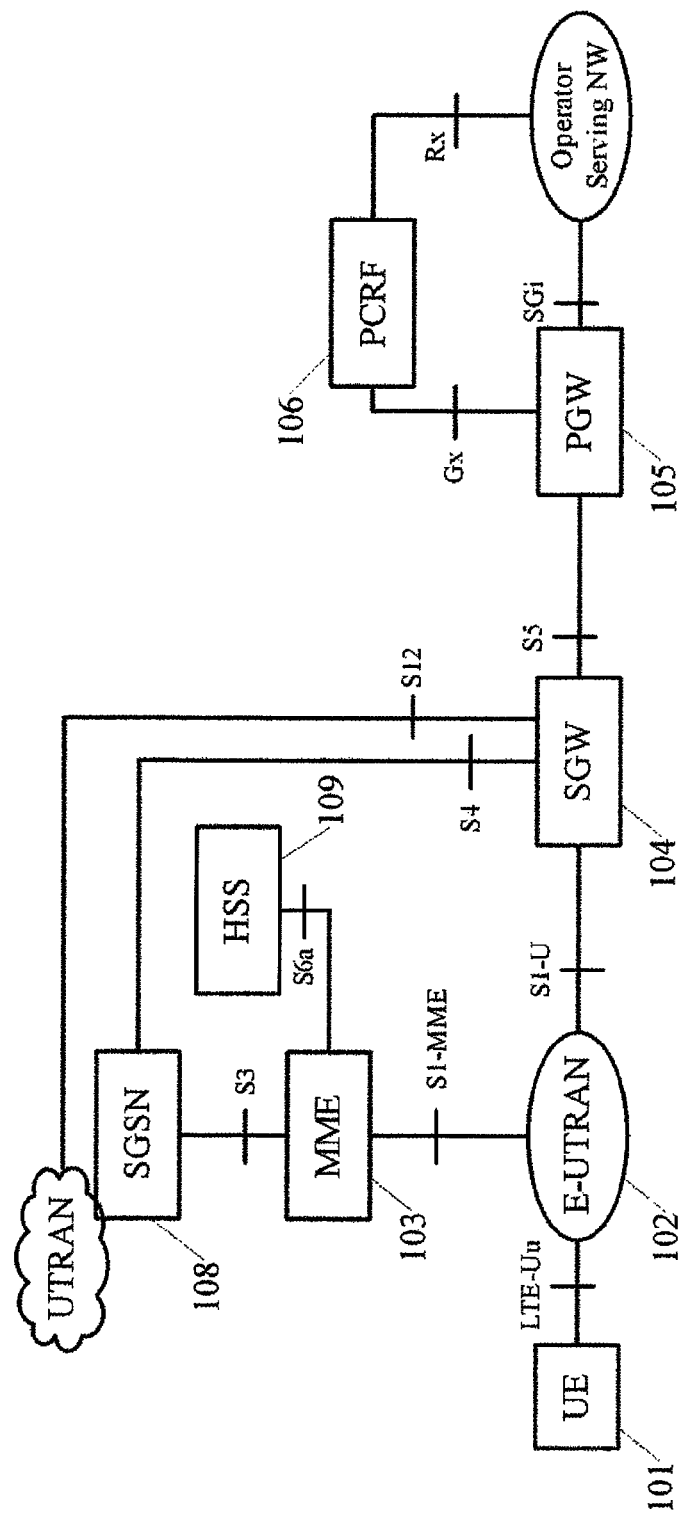
FIG. 1 illustrates a system framework of existing SAE.
Figure 2A:
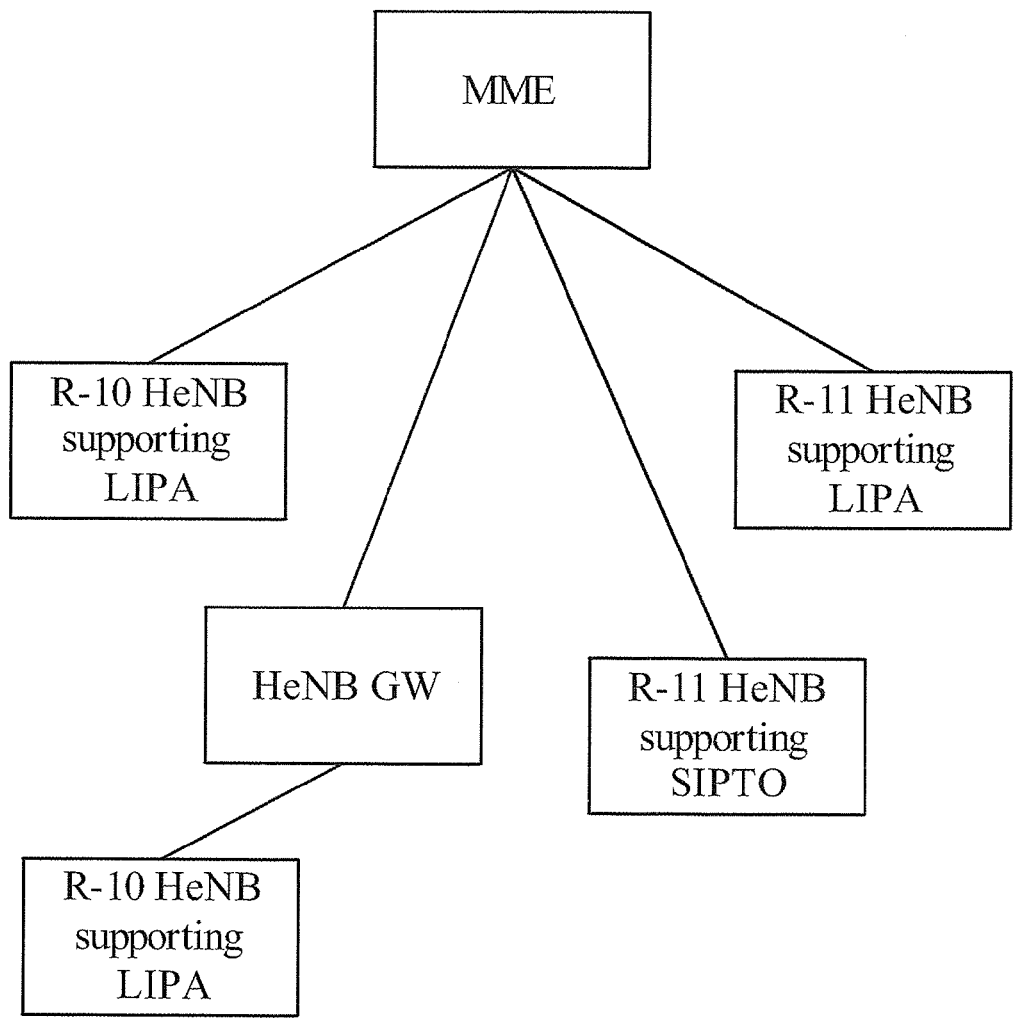
FIG. 2A is a diagram illustrating an existing LET network structure.
Figure 2B:
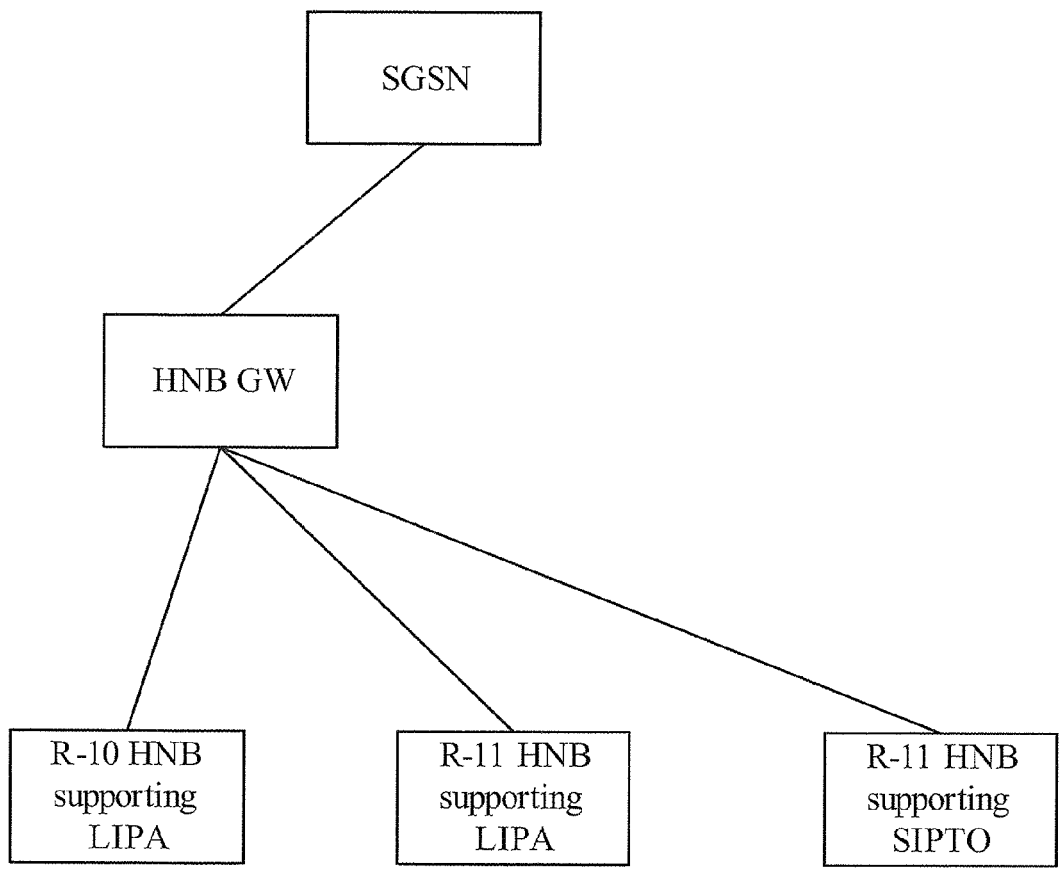
FIG. 2B is a diagram illustrating an existing UMTS network structure.
Figure 3:
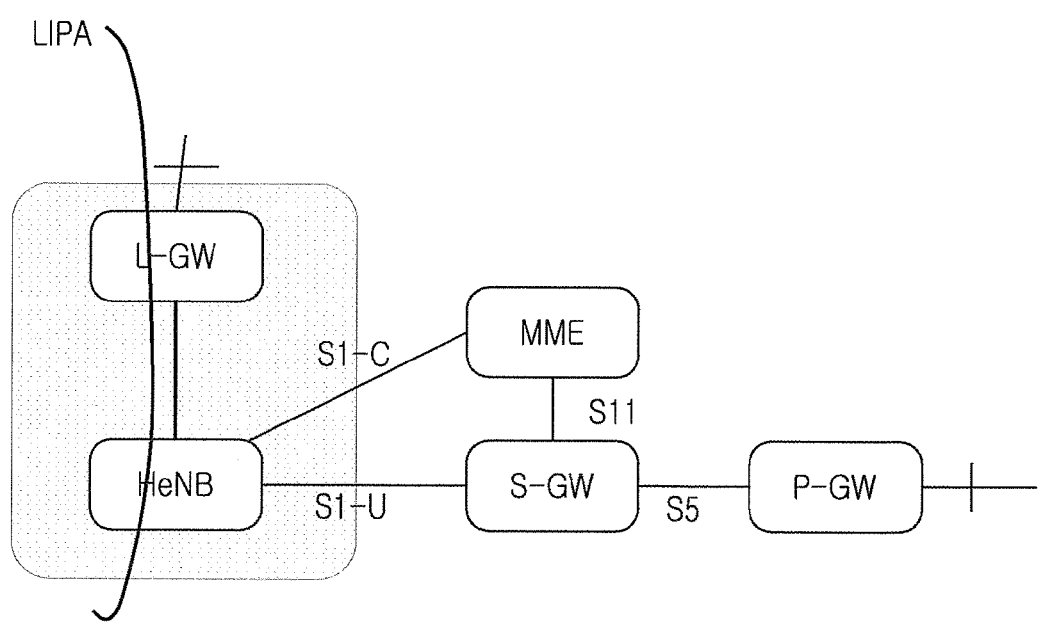
FIG. 3 is a diagram illustrating an R11 LIPA network structure.
Figure 4A:
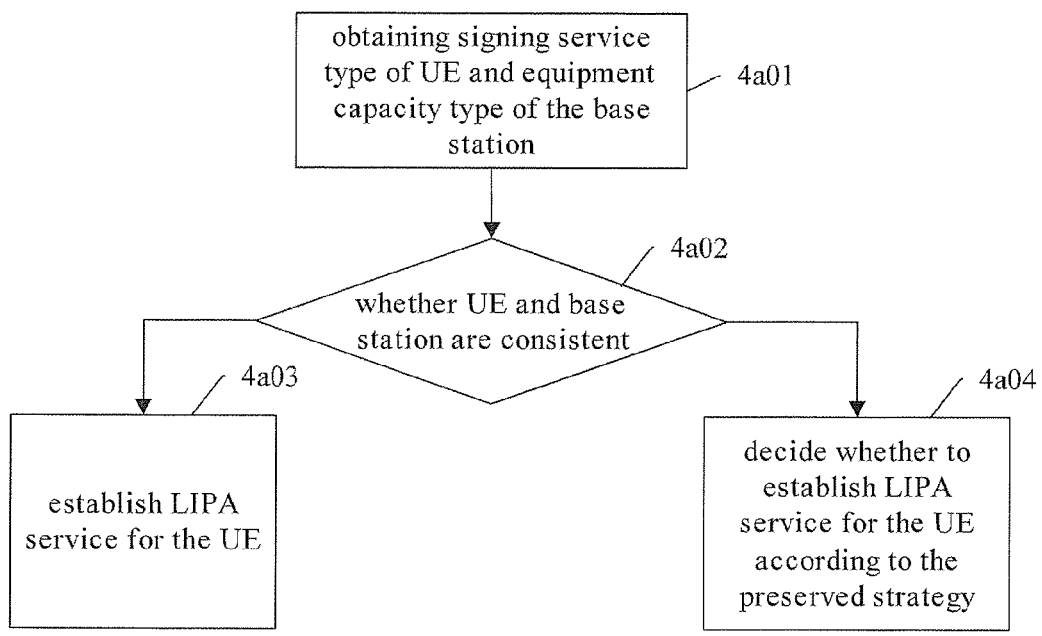
FIG. 4A is a flowchart illustrating a process for guaranteeing the correct establishment of LIPA service according to embodiments of the present disclosure.

The present invention provides a method for guaranteeing the correct establishment of LIPA service. FIG. 4A is a flowchart illustrating a process for guaranteeing the correct establishment of LIPA service according to embodiments of the present disclosure. The method of FIG. 4A includes:

Step 4a01: obtaining service type of the UE and equipment capability type of the base station;

Step 4a02: determining whether the UE and base station are consistent. If the UE and base station are consistent, establishing LIPA service for the UE in block 4a03. If the UE and the base station are not consistent, in block 4a04, decide whether to establish LIPA service for the UE according to the preserved strategy.

An embodiment is described hereinafter.

Embodiment 1

Figure 4B:
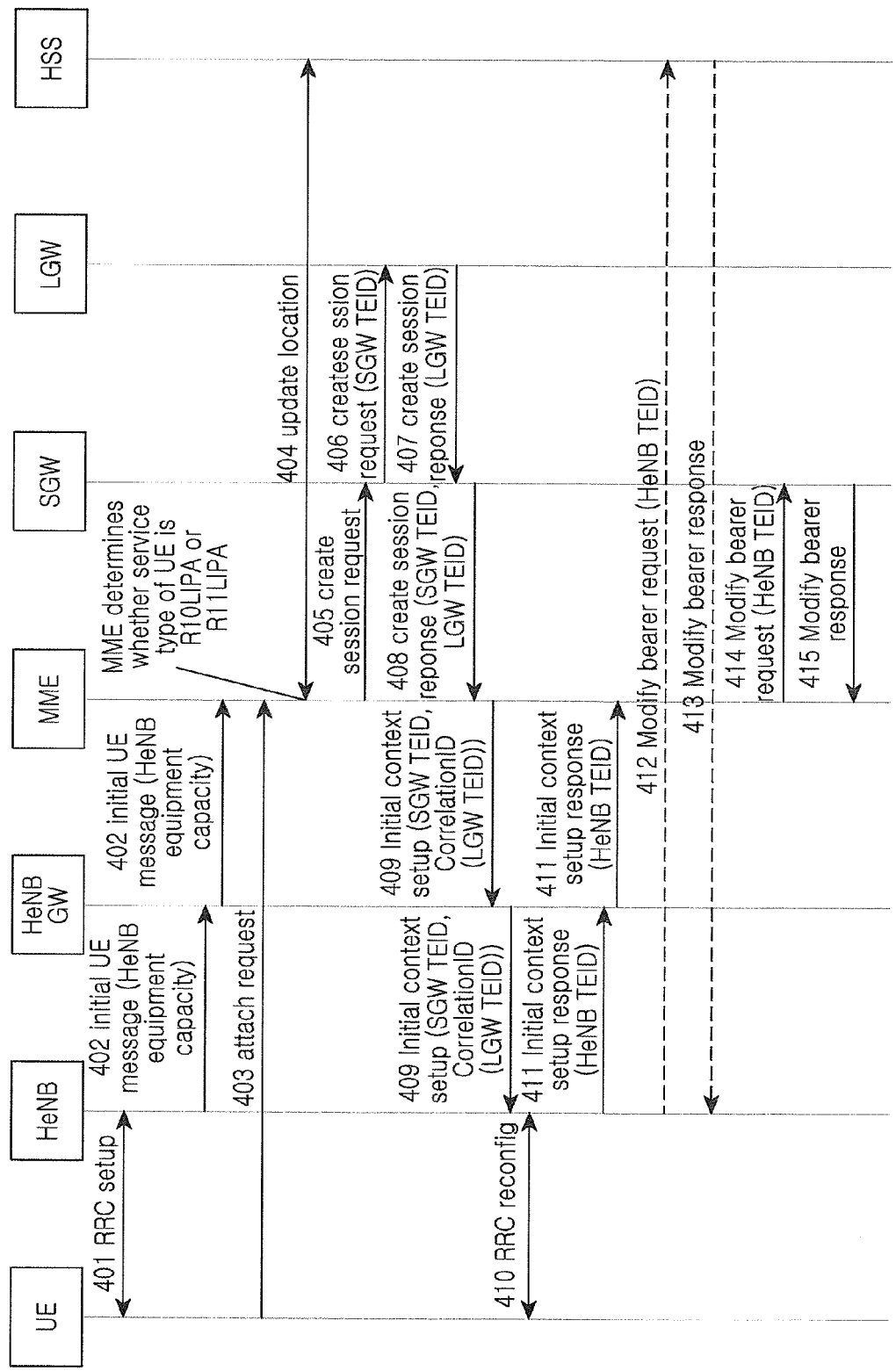
FIG. 4B is a flowchart illustrating a first process for guaranteeing the correct establishment of LIPA service according to embodiments of the present disclosure.

FIG. 4B is a flowchart illustrating a first process for guaranteeing the correct establishment of LIPA service according to embodiments of the present disclosure. The process of FIG. 4B may include the following steps:

401: the process of establishing Radio Resource Control (RRC)

402: HeNB sends initial UE message to HeNB GW, HeNB GW forwards the received initial UE message to MME. For example, when there is HeNB GW arranged in the present embodiment, for the arrangement without HeNB GW, HeNB sends an initial UE message to the MME directly.

The equipment capability parameter of the HeNB can be carried in this message. MME can determine if the current HeNB supports R10 LIPA or R11 LIPA capability via this parameter.

Alternatively, if the HeNB in R11 does not send an LGW IP address in the initial UE message, but the HeNB in R10 sends an LGW IP address in the initial UE message; then the initial UE message sent by the HeNB may not carry the equipment capability parameter of HeNB. Accordingly, the MME can determine directly if the current HeNB supports R10 LIPA or R11 LIPA capability according to whether the initial UE message carries the LGW IP address.

If both the HeNB in R11 and the HeNB in R10 send the LGW IP address in the initial UE message, then the initial UE message sent by the HeNB carries the equipment capability parameter of the HeNB so that the MME can know whether the current accessed HeNB supports R10 LIPA or R11 LIPA capability according to this parameter.

403: The UE sends an attach request message to the MME.

404: The MME updates location information with the HSS. Through this message, the MME can obtain current subscription information of the UE. This subscription information can help the MME to determine the service type of the UE, such as whether the service type of the UE is R10 LIPA or R11 LIPA service.

Using the received equipment capability information of the HeNB accessed by the UE and current subscription information of the UE, the MME can make a determination, and execute corresponding steps according to the determination result:

If the service type of the UE is R10 LIPA, the equipment capability type of the accessed HeNB is R10 LIPA, the MME determines that LIPA service can be established correctly. Steps 405-411 and 414-415 are executed. This portion of the process is the establishment process of R10 LIPA, which is the same as the conventional process.

If the service type of the UE is R11 LIPA, the equipment capability type of the accessed HeNB is R11 LIPA, and through the access control determination process of the MME (such as checking if service request of the UE satisfies its subscription information), the MME determines that LIPA service can be established correctly. The network executes the new LIPA service establishment process according to R11, and executes step 405-415.

If the service type of the UE is R10 LIPA, the equipment capability type of the accessed HeNB is R11 LIPA, the MME needs to determine if LIPA service can be established successfully for the current UE according to the operator strategy. If the MME decides to establish LIPA service successfully for the UE, steps 405-415 are executed, which means establishing R10 LIPA service for the UE according to the R11 LIPA service establishing process.

If the service type of the UE is R11 LIPA, the equipment capability type of the accessed HeNB is R10 LIPA, the MME needs to determine if LIPA service can be established successfully for the current UE according to the operator strategy. If the MME decides to establish LIPA service successfully for the UE, step 405-411 and 414-415 are executed to establish R10 LIPA service for the UE. The MME needs to mark in the context information of the UE that service type of current UE is degraded.

405: the MME sends a create session request to the SGW.

406: the SW sends a create session request to the LGW.

407: the LGW returns create session response message to the SGW.

408: the SGW returns create session response message to the MME.

409: the MME sends initial context setup message to the HeNB GW, this message includes TEID and IP address of the SGW, the TEID and the IP address of LGW. The HeNB sends an initial context setup message to HeNB. This message includes the TEID and the IP address of the SGW, and the TEID and the IP address of the LGW.

410: the RRC reconfiguration process.

411: If it is the R10 HeNB, the HeNB notifies the HeNB GW of its TEID through an internal interface, and the HeNB GW sends initial context setup response message to the MME.

If it is the R11 HeNB, the HeNB sends an initial context setup response message to the HeNB GW, and the HeNB GW forwards the message to the MME.

412: the R11 HeNB sends a modify bearer request message to the LGW. This message includes the HeNB TEID and the HeNB address, as well as the bearer identity.

413: the LGW replies with a modify bearer response message to 1211 HeNB. This message includes the bearer identity.

414: the MME sends a modify bearer request to the SGW

415: the SGW sends a modify bearer response message to the MME.

Embodiment 2

Figure 5:
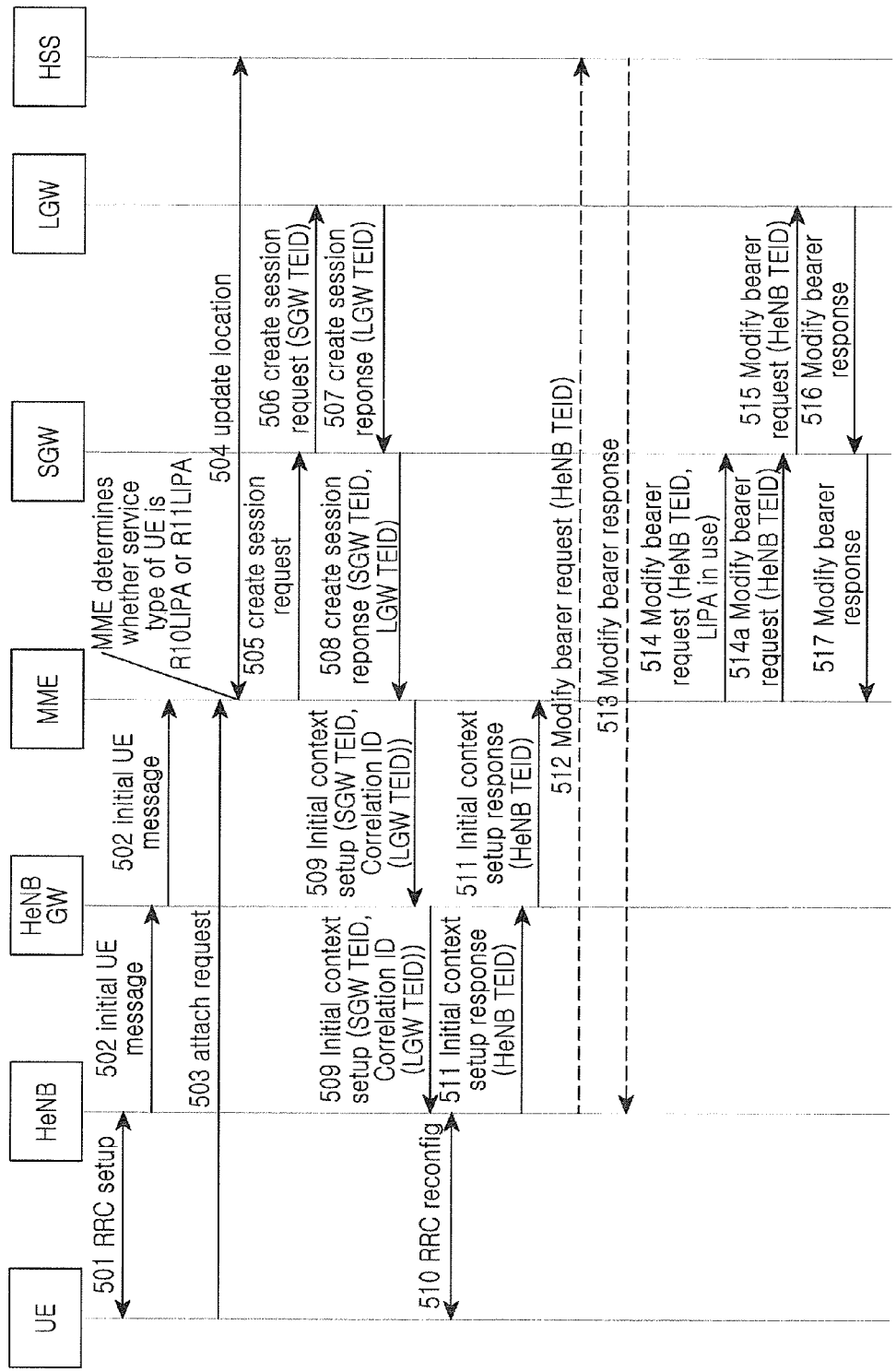
FIG. 5 is a flowchart illustrating a second process for guaranteeing the correct establishment of LIPA service according to embodiments of the present disclosure.

FIG. 5 is a flowchart illustrating a second process for guaranteeing the correct establishment of LIPA service according to embodiments of the present disclosure, which supports an initial attach process. As shown in FIG. 5, this method can include the following steps:

501: RRC establishing process

502: the HeNB sends an initial UE message to the HeNB GW, the HeNB GW forwards the received initial UE message to the MME. For example, when there is the HeNB GW arranged in the present embodiment, for the arrangement without HeNB GW, the HeNB sends the initial UE message to the MME directly.

If the HeNB in R11 does not send the LGW IP address in the initial UE message, but the HeNB in R10 sends the LGW IP address in the initial UE message; the MME can determine directly if the current HeNB supports R10 LIPA or R11 LIPA capability according to whether the initial UE message carries LGW IP address.

503: the UE sends an attach request message to the MME.

504: the MME updates location information with the HSS. Through this message, the MME can obtain current subscription information of the UE. This subscription information can help the MME to determine the service type of the UE, such as the service type of the UE is R10 LIPA or R11 LIPA service.

In accordance with the equipment capability of the HeNB accessed by the UE and the obtained subscription information of the UE, the MME can make judgment, and execute the corresponding steps according to the judging result:

If the service type of the UE is R10 LIPA, the equipment capability type of the accessed HeNB is R10 LIPA, then the MME determines that the LIPA service can be established correctly. This is the similar to embodiment 1.

If the service type of the UE is R11 LIPA, the equipment capability type of the accessed HeNB is R11 LIPA, and through the access control judgment process of the MME, such as checking if the service request of the UE satisfies its subscription information, then the MME determines that the LIPA service can be established correctly, the network establishes the process according to the new LIPA service in R11. Steps 505-513, 514a, and 517 are executed.

If the service type of the UE is R10 LIPA, the equipment capability type of the accessed HeNB is R11 LIPA, the MME needs to determine if LIPA service can be established successfully for the current UE according to the operator strategy. If the MME decides to establish LIPA service successfully for the UE, steps 505-513, 514a and 517 are executed, which means establishing R10 LIPA service for the UE according to R11 LIPA service establishment process.

If the service type of the UE is R11 LIPA, the equipment capability type of the accessed HeNB is R10 LIPA, the MME needs to judge if the LIPA service can be established successfully for the current UE according to the operator strategy. If the MME decides to establish LIPA service successfully for the UE, steps 505-511, 514 and 515-517 are executed to establish R11 LIPA service for UE.

Although the MME obtains the LGW IP address sent by the HeNB, the MME still selects the proper LGW for the UE according to the LGW selection mode of R11, then the MME can select the LGW for the UE by the DNS. According to the selected LGW IP, the MME executes step 505 and starts to establish user plane bearer for the UE.

505-513: the same as 405-413 in embodiment 1.

514: the MME sends the modify bearer request message to the SGW. This message should carry the new LIPA in use, and indicates the SGW to establish the single tunnel of LIPA service for the current UE. This message also comprises the HeNB TEID and the IP address.

514a: the same as step 414.

515: According to the received MME indicating message, the SGW sends the modify bearer request message to the LGW. This message comprises the HeNB TEID and the IP address.

516: the LGW sends the modify bearer response message to the SGW.

517: the SGW sends the modify bearer response message to the MME.

Then, the process of the present embodiment is finished.

Embodiment 3

The present embodiment supports initial attach process.

The difference between the present embodiment and embodiment 1 is in step 409, when the MME finds out that the service type of the UE and the equipment capability are inconsistent, MME further notifies the HeNB of the service type of the current UE. This identity is sent in the initial context setup message.

After the UE service is established successfully, when the UE moves:

if the UE accesses R11 HeNB equipment currently, and the service type of the UE is R10, it is the R10 service that is activated by the network for UE finally. Then the HeNB can reject executing handover and notify LGW through SL interface to trigger LIPA deactivating process. For S1 handover and X2 handover, this method is universal.

Embodiment 4

The present embodiment supports initial attach process.

The difference between the present embodiment and embodiment 2 is in step 509, when MME finds out that the service type of the UE and the equipment capability are inconsistent, the MME further notifies the HeNB of the service type of the current UE. This identity is sent in the initial context setup message.

After the UE service is established successfully, when the UE moves:

if the UE accesses the R11 HeNB equipment currently, the service type of the UE is R10, the network activates the R10 service for the UE finally. Then the HeNB can reject executing handover and notify the LGW through SL interface to trigger LIPA deactivating process. For S1 handover and X2 handover, this method is universal.

Embodiment 5

Figure 6:
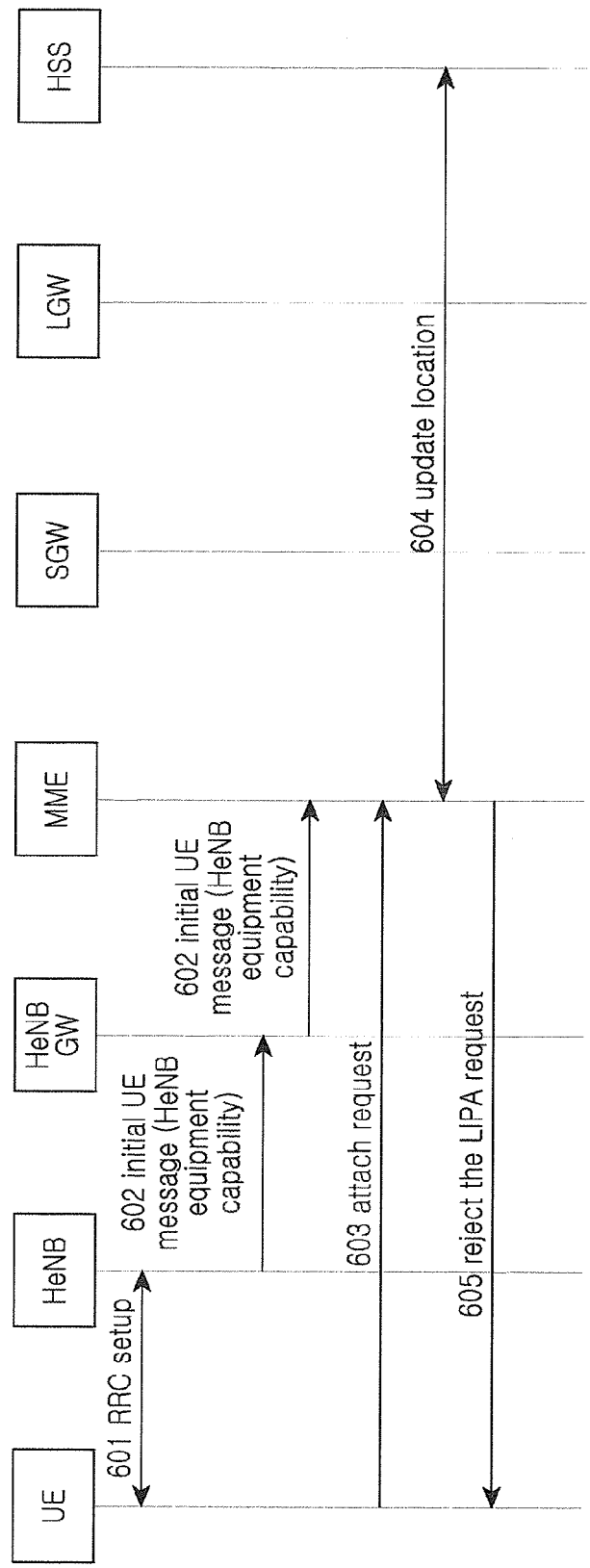
FIG. 6 is a flowchart illustrating a third process for supporting initial attach process according to embodiments of the present disclosure.

FIG. 6 is a flowchart illustrating a third process for supporting initial attach process according to embodiments of the present disclosure, wherein LIPA service is not established successfully. As shown in FIG. 6, this method can include the following steps:

601: RRC establishing process.

602: the HeNB sends the initial UE message to the HeNB GW. The HeNB GW forwards the received initial UE message to the MME. For example, when there is the HeNB GW arranged in the present embodiment, for the arrangement without HeNB GW, the HeNB sends the initial UE message to the MME directly.

This message can carry the equipment capability parameter of the HeNB. Through this parameter, the MME can determine whether the current HeNB supports R10 LIPA or R11 LIPA capability.

Alternatively, if the HeNB in R11 does not send the LGW IP address in the initial UE message, but the HeNB in R10 sends the LGW IP address in the initial UE message; the initial UE message sent by the HeNB may not carry the equipment capability parameter of HeNB, the MME can determine directly if current HeNB supports R10 LIPA or R11 LIPA capability according to whether the initial UE message carries LGW IP address If both the HeNB in R11 and the HeNB in R10 send the LGW IP address in the initial UE message, then the initial UE message sent by the HeNB carries the equipment capability parameter of the HeNB, so that the MME knows whether the current accessed HeNB supports R10 LIPA or R11 LIPA capability by this parameter.

603: the UE sends the attach request to the MME.

604: the MME updates location information with the HSS. According to this message, the MME can obtain current subscription information of the UE. This subscription information can help the MME to determine the service type of the UE, such as the service type of UE is R10 LIPA service or R11 LIPA service.

According to the received equipment capability information of the HeNB accessed by the UE and the current subscription information of the UE, the MME can make a determination, and execute corresponding steps according to the determination result:

if the service type of the UE is R10 LIPA, the equipment capability type of the accessed HeNB is R11 LIPA; or, if the service type of the UE is R11 LIPA, and the equipment capability type of the accessed HeNB is R10 LIPA, the network decides to reject the current access request according to the operator strategy, and step 605 is executed;

605: the MME sends the reject LIPA request to the UE. This request message can include an identity, which indicates that the UE is to make the attach request or PDN connection request immediately.

Embodiment 6

Figure 7:
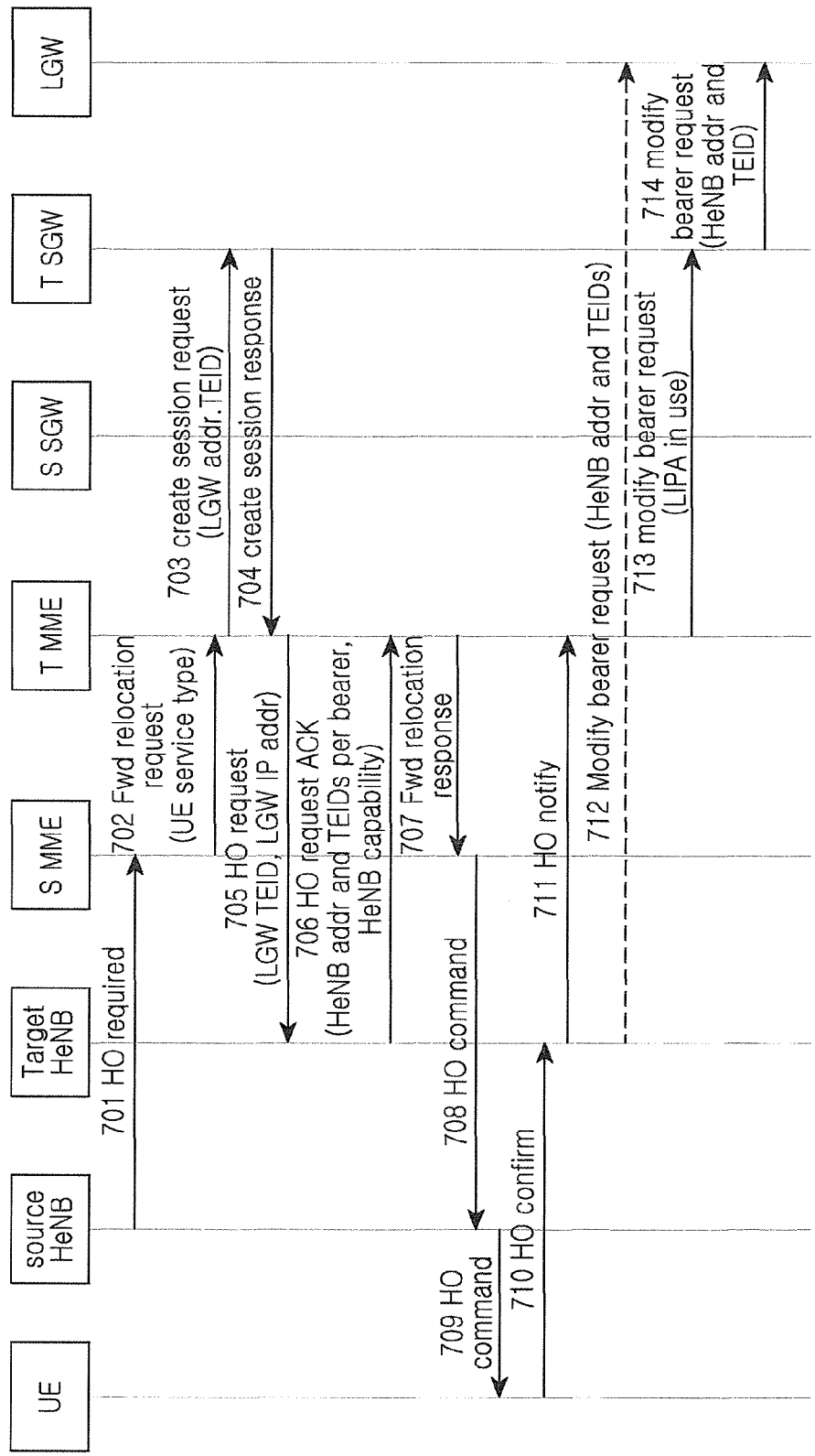
FIG. 7 is a flowchart illustrating a fourth process for guaranteeing the correct establishment of LIPA service according to embodiments of the present disclosure.

FIG. 7 is a flowchart illustrating a fourth process for a UE S1 handover process according to embodiments of the present disclosure This method can comprise the following steps:

701: The source HeNB sends the HO required message to the source MME.

702: The source MME sends a Fwd relocation request message to the target MME. This message comprises the identity information indicating the service type of the UE.

703: If a SGW reselection occurs, the target MME will send a create session request message to the target SGW. This message includes the TEID and the IP address of the LGW.

704: The target SGW returns the create session response to the target MME.

705: The target MME sends an HO request to the target HeNB. This message carries the TEID and the IP address of the LGW, which guarantees that the target HeNB can establish a user plane tunnel with the LGW.

706: The target HeNB returns the HO request confirmation message to the target MME, this message carries the TEID and the IP address information of the HeNB, and identity information indicating equipment capability of HeNB.

In accordance with the received equipment capability information of HeNB and the service type of the UE, the target MME can make a determination, and execute corresponding steps according to the determination result:

If the service type of the UE is R10 LIPA, the current handover service is a single bearer, the target MME determines that the handover has failed, and the MME deactivates the bearer supporting LIPA service and ends the current process. If the UE has multiple bearers, the target MME deactivates the bearer supporting LIPA service directly, the current handover process continues, and does not carry the bearer information related with LIPA in a subsequent process.

If the service type of the UE is R11 LIPA, the equipment capability type of accessed HeNB is R11 LIPA, and through the access control judgment process of the MME, the target MME determines that the handover can be executed continuously, and step 707-712 are executed. The follow-up process is the same as the conventional process.

If the service type of the UE is R11 LIPA, the equipment capability type of the accessed HeNB is R10 LIPA, the target MME needs to judge whether the LIPA service of the current UE can switch successfully according to the operator strategy. If the target MME decides that the LIPA service still can switch successfully, steps 707-711 and steps 713-714 are executed, and the follow-up steps are same as the conventional process.

707: The target MME sends a forward relocation response message to the source MME.

708: The source MME sends an HO command to the source HeNB.

709: The source HeNB sends an HO command to the UE.

710: The UE sends HO a confirmation to the target HeNB.

711: The target HeNB sends an HO notify to the target MME.

712: If the target HeNB is equipment supporting R11 LIPA, a modify bearer request message is sent to the LGW. This message includes the TEID and the address information of HeNB.

713: The target MME sends the modify bearer request message to the target SGW, for the situation that the service type of UE is R11 LIPA, equipment capability type of the accessed HeNB is R10 LIPA, the target MME decides to finish successful handover for the UE, then carries the new identity in this message, which indicates that the target SGW needs to establish the single tunnel supporting LIPA service.

714: The target SGW sends the modify bearer request message to LGW. This message includes the TEID and the IP address of HeNB, which guarantees successful single tunnel establishment.

Embodiment 7

Figure 8:
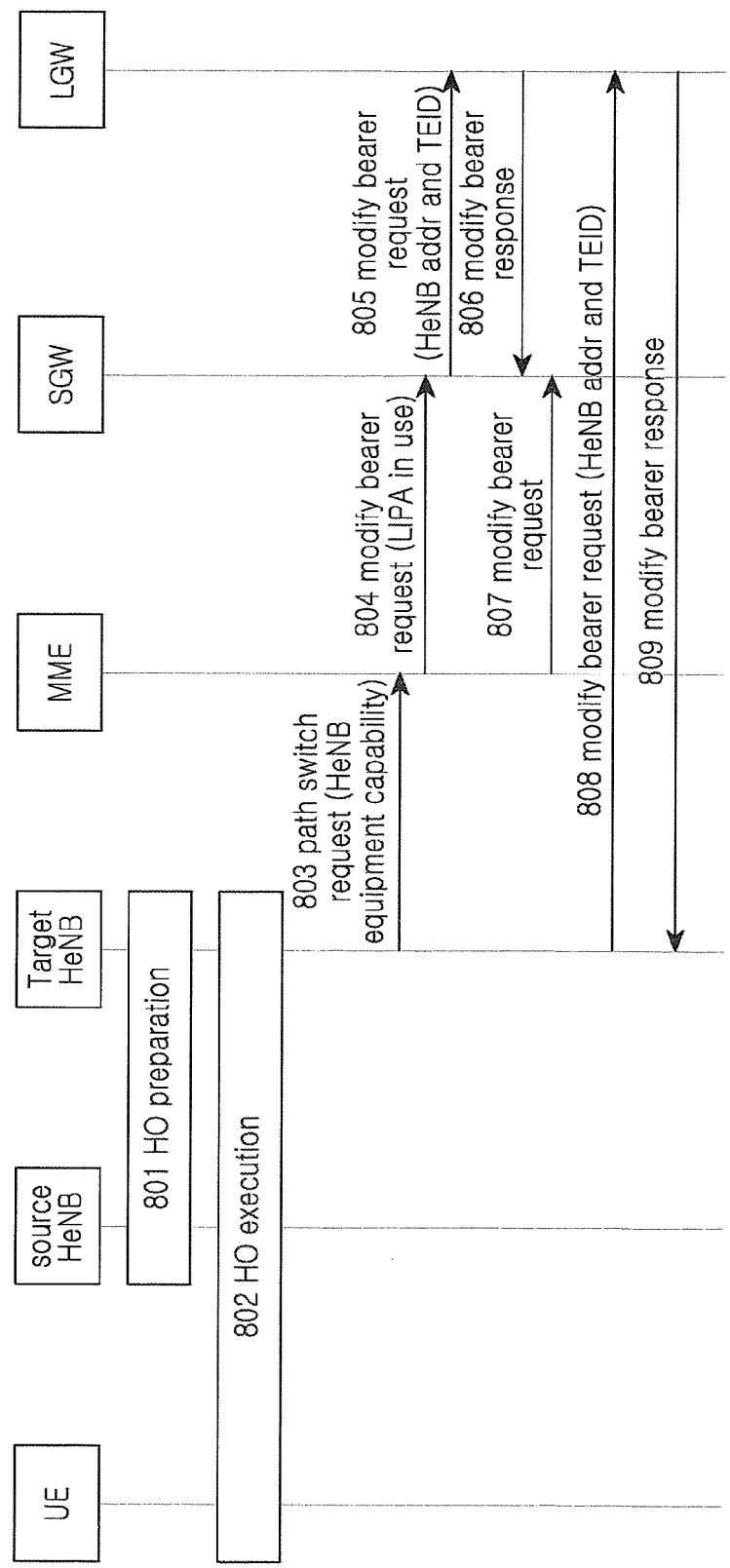
FIG. 8 is a flowchart illustrating a process for UE S2 handover process according to embodiments of the present disclosure.
Figure 9:
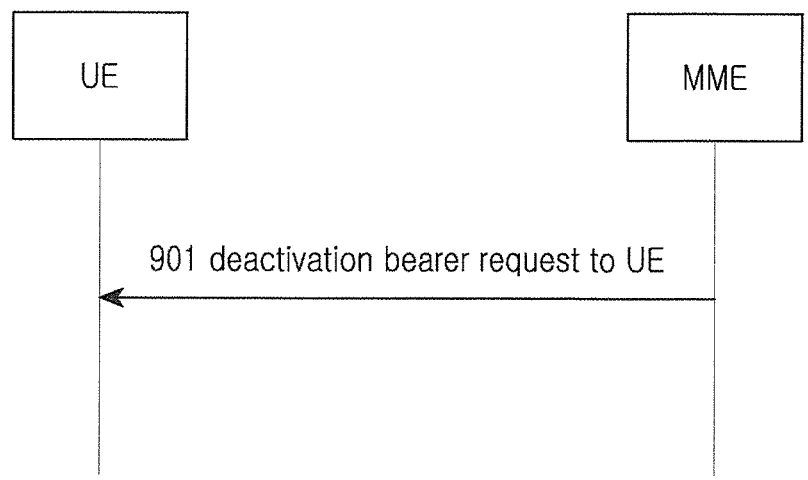
FIG. 9 is a flowchart illustrating bearer deactivation process issued by the LGW, or the bearer deactivation process issued by the MME according to embodiments of the present disclosure.

FIG. 8 a process for UE S2 handover process according to embodiments of the present disclosure. This method can include the following steps:

801: HO preparation process.

802: HO execution process.

803: The target HeNB sends a Path switch request message to the MME. This message carries the information indicating the equipment type of current HeNB.

According to the equipment type information of the HeNB and the saved subscription information of the UE, the MME can make a determination and execute corresponding steps according to the determination result:

if the service type of UE is R10 LIPA, the current handover service is single bearer, the MME determines that the handover has failed, the MME activates the bearer supporting LIPA service, and ends current process. If the UE has multiple bearers, the MME activates the bearer supporting LIPA service directly, current handover process continues, and the bearer information related with LIPA is not carried in the follow-up process.

If the service type of UE is R11 LIPA, the equipment capability type of the accessed HeNB is R11 LIPA, and through the access control judgment process of the MME, the MME determines that handover can be executed continuously, and steps 803, 807-809 are executed.

If the service type of the UE is R11 LIPA, the equipment capability type of accessed HeNB is R10 LIPA, the MME needs to determine whether the LIPA service of the current UE can switch successfully according to operator strategy. If the MME determines that LIPA service can still switch successfully, steps 803-806 are executed.

804: The MME sends the modify bearer request to the SGW, this message carries the identity information indicating for the SGW to establish LIPA single tunnel.

805: According to the received single tunnel identity, the SGW sends the modify bearer request to the LGW. This message includes the HeNB address and the TEID.

806: The LGW sends the modify bearer response message to the SGW.

807: The MME sends the modify bearer request to the SGW.

808: If the HeNB is the equipment supporting R11 LIPA, the modify bearer request message is sent to the LGW. This message carries the HeNB address and the TEID.

809: The LGW sends the modify bearer response message to the HeNB. This message carries the TEID and the IP address of the LGW.

Embodiment 8

The present embodiment introduces the bearer deactivation process issued by LGW, or the bearer deactivation process issued by the MME. Takes the bearer deactivation process issued by the MME, for example, in FIG. 9, comprising:

901: the MME sends a deactivate bearer request to the UE. This message can include a new identity, which is used to indicate the reason why the UE fails to move currently, or this new identity is used to indicate that the UE issues LIPA service request message to the MME immediately (because the UE service is degraded, the MME requires that the UE issues a new service request immediately according to operator strategy, according to the new reason value, the UE can issue a service request from other base stations).

The bearer deactivation process issued by the LGW can happen under the situation below:

The UE signs R11 LIPA service, but after the network activates LIPA service for the UE, the service of the UE is degraded, and the current service type of the UE is R10 LIPA. If the UE moves, after it moves out of the current base station, the LGW triggers the deactivation process.

The bearer deactivation process issued by the MME can happen under the situation below:

When the UE switches, if the MME determines that current service type of the UE is R10 LIPA, or the MME determines that current handover cannot be successful, the MME needs to issue the deactivation process, and deactivates the bearer supporting LIPA service.

In the above two kinds of deactivation processes, the MME needs to send a non-access stratum (NAS) message: deactivation bearer request to UE, and this message can include new an identity: indicating the reason why the UE fails to switch, or this new identity is used to indicate that the UE issues a LIPA service request message to the MME immediately.

Embodiment 9

Embodiment 9 provides a kind of MME UE context realization mode provided by embodiment 9. As shown in table 1, a new identity is added to the UE context information, which indicates the service type that the UE actually establishes, and this identity has two values:

R10 LIPA—indicates that the current service is R10 LIPA service;

R11 LIPA—indicates that the current service is R11 LIPA service;

After the MME activates corresponding service for the UE according to the capability of HeNB and subscription information of the UE, the MME will mark current service with corresponding value.

The two values of service type is an example, not excluding the possibility for more values.

The details can be referenced as in table 1.

TABLE 1

| Content | Description |
| --- | --- |
| CSG signing data | CSG subscription information is a group of lists of CSG ID in each VPLMN. Every CSG ID has corresponding effective time limit, which means that CSG ID is effective within the limit time. If there is no corresponding effective time limit, it means the subscription information without limit. Every CSG ID can access specific PDN through local IP. Every CSG ID has corresponding APN(s) information. |
| Allow to use LIPA when visit PLMN | Indicate whether to allow UE to use local IP access service in this PLMN. |
| Service type of UE | Indicate whether current APN is used for R10 LIPA or R11 LIPA. |
| Service activation identity | Indicate current actual activated service type: R11 LIPA, R10 LIPA. |
| Allow to access SIPTO | Indicate whether the service corresponding to current APN is allowed of SIPTO or not. |
| Allow to access LIPA | Indicate that current PDN can be accessed through local IP access. There are 3 corresponding parameters: LIPA not allowed, LIPA only, and conditional LIPA. |

The MME can determine whether the current UE service is changed or is degraded according to the service type and service activation identity of the UE.

Alternatively, the MME can identify whether the UE service is degraded by other means. For example, adding simple parameters 0, 1, this indicates whether the actually activated service of the UE is consistent with current service type or is degraded.

For more illustration, in the present step, the format of the UE subscription information is as shown in table 2.

TABLE 2

| Content | Description |
| --- | --- |
| Access Point Name (APN) | An identity defined according to DNS name convention, denoting the access point name accessing to the packet data network. |
| CSG signing data | CSG subscription information is a group of lists of CSG ID in each VPLMN. Every CSG ID has corresponding effective time limit, which means that CSG ID is effective within the limit time. If there is no corresponding effective time limit, it means the subscription information without limit. Every CSG ID can access specific PDN through local IP. Every CSG ID has corresponding APN(s) information. |
| Allow to use LIPA when visit PLMN | Indicate whether to allow UE to use local IP access service in this PLMN. |
| Service type identity | Indicate the service type supported by current UE: supporting R10 LIPA, or supporting R11 LIPA. |
| Allow to access SIPTO | Indicate whether the service corresponding to current APN is allowed of SIPTO or not. |
| Allow to access LIPA | Indicate that current PDN can be accessed |

TABLE 2-continued

| Content | Description |
|---------|-------------|
| | through local IP access. There are 3 corresponding parameters: LIPA not allowed, LIPA only, and conditional LIPA. |

Embodiment 10

Figure 10:
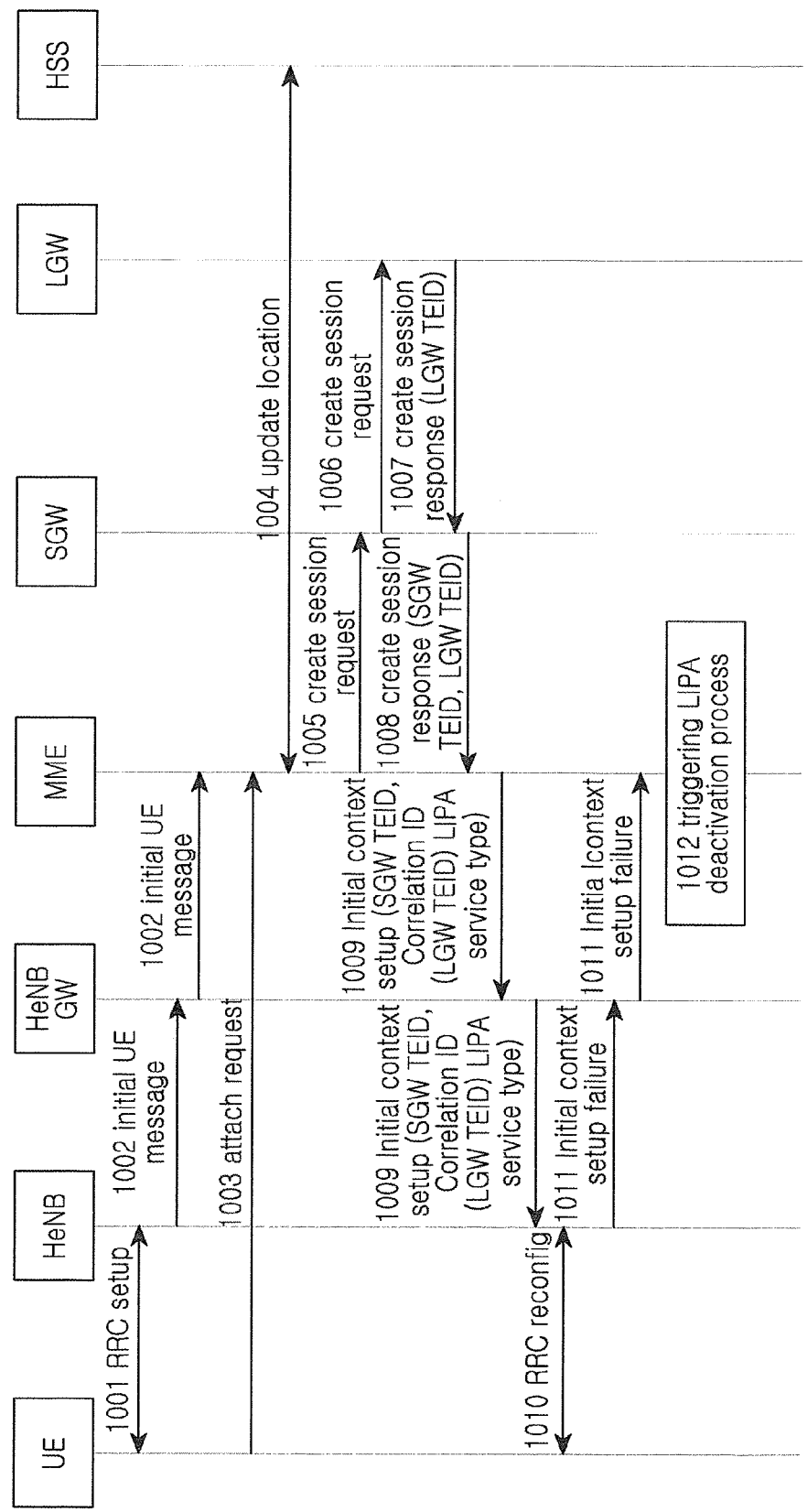
FIG. 10 is a flowchart illustrating a seventh process for guaranteeing the correct establishment of LIPA service according to embodiments of the present disclosure.

FIG. 10 is a flowchart illustrating the method provided by embodiment 10 of the present invention, supporting initial attach process, LIPA service is not established successfully, as shown in FIG. 10, this method can comprise the following steps:

1001: RRC is established.

1002: HeNB sends initial UE message to HeNB GW, and HeNB GW forwards the received initial UE message to the MME. The present embodiment takes the example that the HeNB GW is arranged, without the arrangement of the HeNB GW, the HeNB sends the initial UE message to the MME directly.

1003: The UE sends the attach request message to the MME.

1004: The MME updates location information with the HSS. Through this message, the MME can obtain the current subscription information of the UE. This subscription information can help the MME to determine service type of UE, like the service type of UE is R10 LIPA service or R11 LIPA service.

1005: The MME sends create bearer request to the SGW.

1006: The SGW sends create bearer request to the LGW.

1007: The LGW replies create bearer response to the SGW.

1008: The SGW replies create bearer response to the MME.

1009: The MME sends initial context setup message to the HeNB GW, this message includes the TEID and the IP address of the SGW, and the TEID and the IP address of LGW. The HeNB GW sends the initial context setup message to the HeNB. This message includes the TEID and the IP address of the SGW, and the TEID and the IP address of the LGW. Meanwhile, this message carries the signing LIPA service type of the UE.

The HeNB makes a determination according to the equipment capability of itself, namely whether R10 LIPA capability or R11 LIPA equipment capability is supported, as well as the obtained LIPA service type signed with the UE, and executes corresponding steps according to the determination result:

If the service type of UE is R10 LIPA, the accessed equipment capability type is R10 LIPA; or, if the service type of UE is R11 LIPA, the equipment capability type of accessed HeNB is R11 LIPA, the follow-up executed steps are the same as the description of embodiment 1 and that of embodiment 2.

If the service type of UE is R10 LIPA, the accessed equipment capability type is R11 LIPA; or, if the service type of UE is R11 LIPA, the accessed equipment capability type is R10 LIPA, execute step 1010-1012.

1010: RRC reconfiguration.

1011: If the HeNB determines that current service cannot be established successfully, an initial context setup failure message is sent to the MME.

1012: The MME triggers a bearer deactivation process and releases the related LIPA bearer.

Embodiment 11

Figure 11:
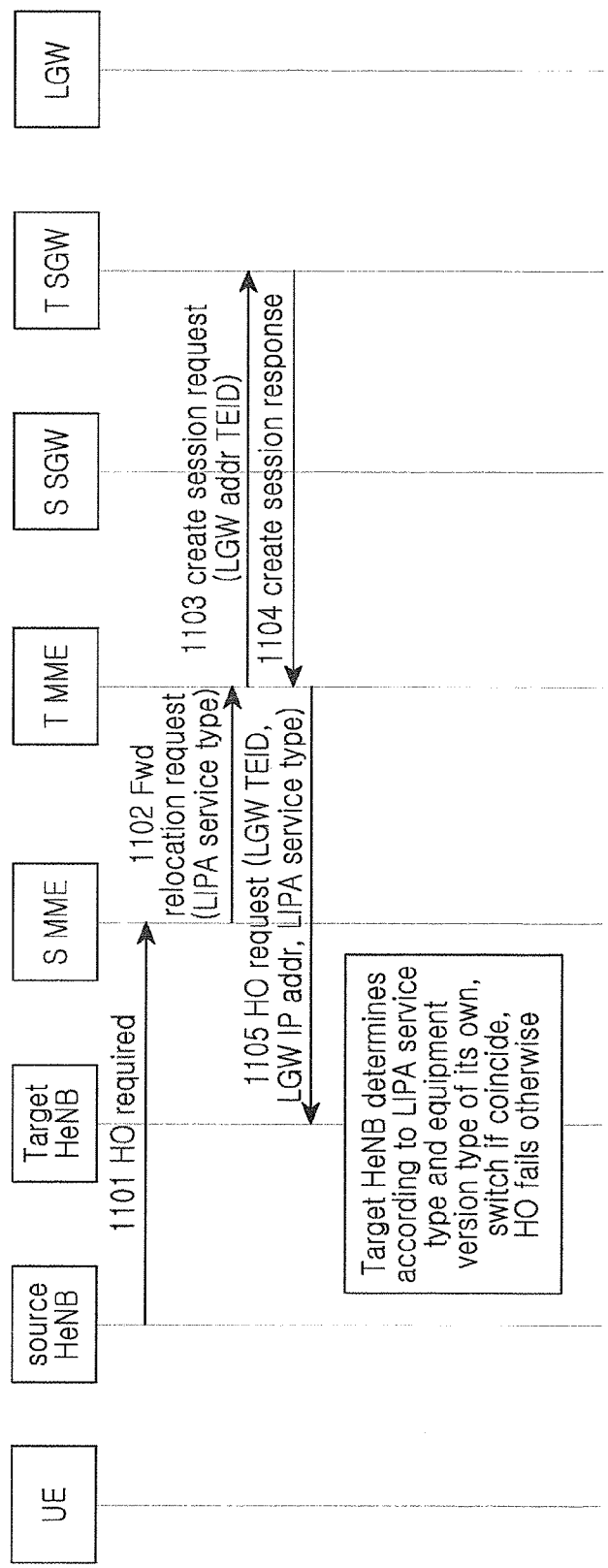
FIG. 11 is a flowchart illustrating a handover process when the LIPA service is not established successfully according to embodiments of the present disclosure.

FIG. 11 is a flowchart illustrates a handover process when the LIPA service is not established successfully according to embodiments of the present disclosure. As shown in FIG. 11, this method can include the following steps:

1101: The source HeNB sends the HO request message to the source MME.

1102: The source MME sends a Fwd relocation request message to the target MME. This message includes identity information indicating service type of the UE.

1103: If SGW reselection happens, the target MME will send the create session request message to the target SGW. This message includes the TEID and the IP address of the LGW.

1104: The target SGW replies with a create session request to the target MME.

1105: The target MME sends the HO request to the target HeNB. This message carries the TEID and the IP address of the LGW, which guarantees that the target HeNB can establish user plane tunnel with LGW. This message carries signing LIPA service type of UE.

HeNB makes a determination according to equipment capability of itself, namely whether R10 LIPA capability or R11 LIPA equipment capability is supported, and the obtained signing LIPA service type of UE, and executes corresponding steps according to the determination result:

If the service type of UE is R10 LIPA, the accessed equipment capability type is R10 LIPA; or, if service type of UE is R11 LIPA, the equipment capability type of accessed HeNB is R11 LIPA, the follow-up executed steps are the same as the description of embodiment 6.

If the service type of the UE is R10 LIPA, the accessed equipment capability type is R11 LIPA; or, if the service type of the UE is R11 LIPA, the accessed equipment capability type is R10 LIPA, the HeNB determines that handover fails. For the situation that the UE accesses multiple bearers, the HeNB determines that the LIPA bearer needs to be released. After receiving the reply message of the HeNB, the MME will trigger deactivation of LIPA bearer.

Embodiment 12

Figure 12:
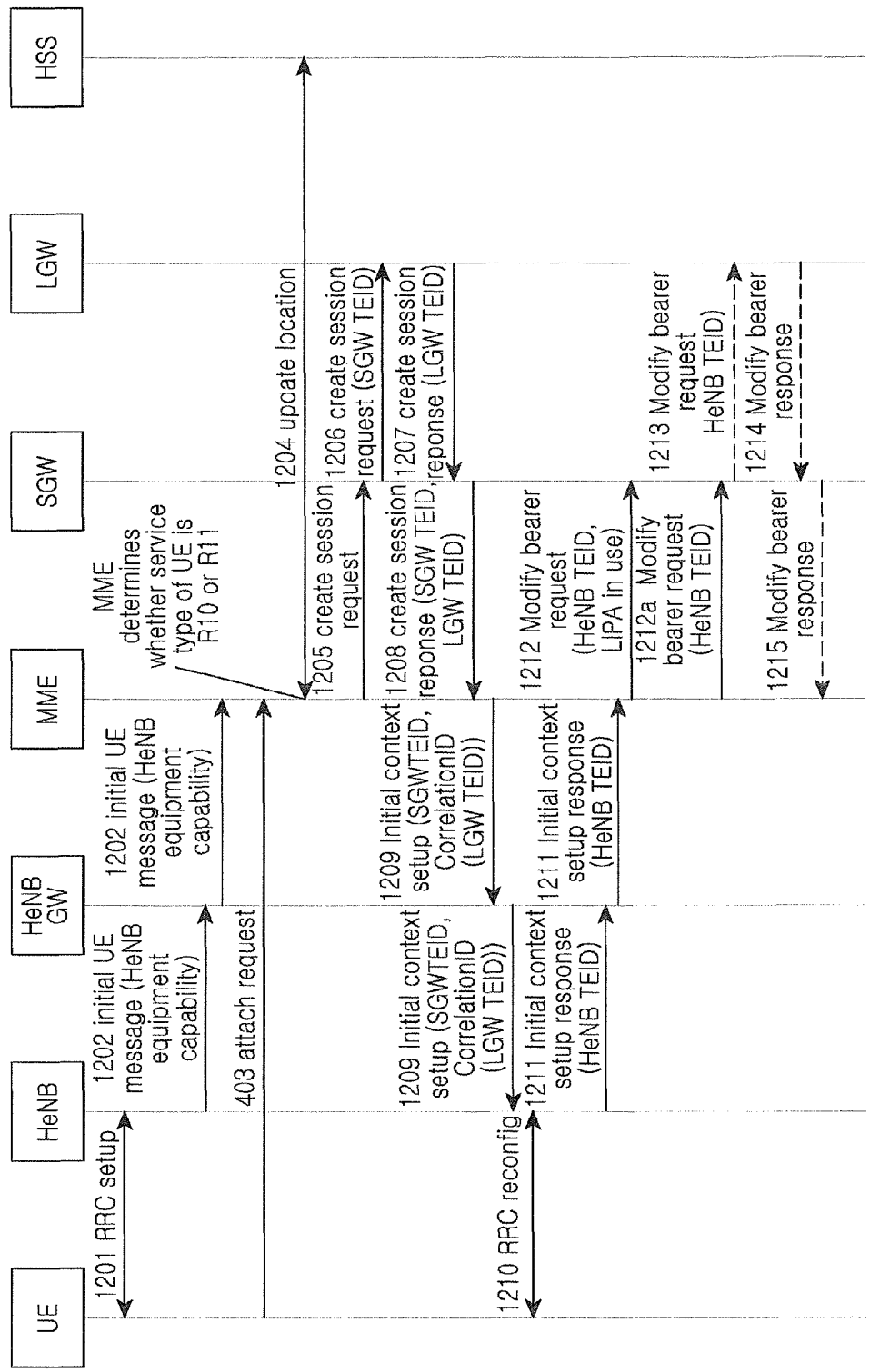
FIG. 12 is a flowchart illustrating another process for guaranteeing the correct establishment of LIPA service according to embodiments of the present disclosure.

The present embodiment is the process that supports the UE attach network based on the description in architecture possibility 2. FIG. 12 is a flowchart illustrating another process for guaranteeing the correct establishment of LIPA service according to embodiments of the present disclosure. As shown in FIG. 12, this method can include the following steps:

1201: RRC establishing process.

1202: The HeNB sends initial the UE message to the HeNB GW, and the HeNB GW forwards the received initial UE message to the MME. The present embodiment takes the example that the HeNB GW is arranged, without arrangement of the HeNB GW, HeNB sends the initial UE message to the MME directly.

This message can carry the equipment capability parameter of the HeNB. The MME can determine whether current the HeNB supports R10 LIPA or R11 LIPA capability according to this parameter.

Alternatively, if the HeNB in R11 does not send the LGW IP address in the initial UE message, but the HeNB in R10 sends the LGW IP address in the initial UE message; then the initial UE message sent by the HeNB may not carry the equipment capability parameter of the HeNB. The MME can determine directly if the current HeNB supports R10 LIPA or R11 LIPA capability according to whether initial UE message carries LGW IP address.

If both the HeNB in R11 and the HeNB in R10 send LGW IP address in initial UE message, the initial UE message sent by HeNB carries equipment capability parameter of the HeNB, so that the MME can know if the current accessed HeNB supports R10 LIPA or R11 LIPA capability according to this parameter.

1203: The UE sends attach request message to the MME.

1204: The MME updates location information with the HSS. According to this message, the MME can obtain the current subscription information of the UE. This subscription information can help the MME to determine the service type of the UE, like the service type of UE is R10 LIPA or R11 LIPA service.

Through the received equipment capability information of the HeNB accessed by the UE and the current subscription information of the UE, the MME can make a determination, and execute corresponding steps according to the determination result:

If the service type of UE is R10 LIPA, and equipment capability type of the accessed HeNB is R10 LIPA, the MME determines that LIPA service can be established correctly. Steps 1205-1211, 1212a, and 1215 are executed. This process is the R10 LIPA establishing process, the same as the convention process, also discussed with respect to the description of embodiment 1.

If the service type of UE is R11 LIPA, the equipment capability type of the accessed HeNB is R11 LIPA, and through the access control determination process of the MME (such as checking if the service request of UE satisfies its subscription information), the MME determines that the service can be established correctly, the network establishes the process according to new LIPA service in R11. Steps 1205-1215 are executed. However, step 1212a is not executed.

If the service type of UE is R10 LIPA, and equipment capability type of the accessed HeNB is R11 LIPA, the MME needs to determine if LIPA service can be established successfully for the current UE according to the operator strategy. If the MME decides to establish LIPA service successfully for the UE, steps 1205-1215 are executed. However, step 1212a is not executed.

If the service type of UE is R11 LIPA, and equipment capability type of the accessed HeNB is R10 LIPA, the MME needs to determine if LIPA service can be established successfully for the current UE according to the operator strategy. If the MME decides to establish LIPA service successfully for UE, steps 1205-1211, 1212a, 1215 are executed. This process is R10 LIPA establishing process, the same as the prior art (the same as the description of embodiment 1). The difference is that the MME needs to mark in the context information of the UE that service type of the current UE is degraded.

1205-1211: The same as step 405-411 in embodiment 1.

1212a: The MME sends the modify bearer request message to the SGW. This message includes the HeNB TEID and the HeNB address, bearer identity.

1212: If the MME knows that the UE is accessed through R11 HeNB, the MME sends the modify bearer request message to the SGW. This message includes the HeNB TEID and the HeNB address, the bearer identity, and the identity information indicating to establish LIPA single tunnel.

1213: The SGW sends the modify bearer request to the LGW according to the received single tunnel identity for establishing LIPA service. This message carries the HeNB TEID and the IP address.

1214: The LGW replies with a modify bearer response message to the SGW.

1215: The SGW replies with modify bearer response message to the MME.

Embodiment 13

The difference between embodiment 13 and embodiment 12 is that:

1204: For the situation that the service type of the UE is R11 LIPA, the equipment capability type of the accessed HeNB is R10 LIPA, the MME needs to determine whether to establish the LIPA service successfully for the current UE according to the operator strategy.

For R11 and R10 LIPA, for the situation that the HeNB sends IP address of the LGW to the MME in the initial UE message, the MME determines the current scene according to the received equipment capability of HeNB, if it happens that the service type of UE is R11 LIPA, the equipment capability type of accessed HeNB is R10 LIPA, the MME still decides to establish R11 LIPA service for the UE, and steps 1205-1215 are executed. However, step 1212a is not executed. Therefore, the UE service is not degraded.

R11 and R10 LIPA can use different LGW selection modes, in R10 LIPA, HeNB in R10 send IP address of the LGW to the MME in the initial UE message. However, the HeNB in R11 does not use this message to send IP address of LGW. The MME can determine via which type of HeNB UE is accessed according to whether IP address of LGW is received. If the MME receives IP address of LGW, the MME determines that the UE accesses via R10 HeNB, but it is the R11 service that the UE signs in the subscription information, according to operator strategy, the MME still decides to establish R11 LIPA service for UE. In that way, the MME selects a new LGW by LGW selection mode of DNS, disregarding of the received IP address of LGW. In this situation, steps 1205-1215 are executed. However, step 1212a is not executed. Therefore, the UE service is not degraded, and can still support the continuity of R11 service. The MME requests to establish a bearer for the UE according to the new selected LGW, and starts to execute step 1205.

The above illustration is just a preferable embodiment of the present invention and not used to confine the present invention, and any modification, equivalent substitute and improvement within spirit of the present invention are in protection scope of the present invention. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to guarantee correct establishment of local IP access (LIPA) service, comprising:
obtaining a service type of a user equipment (UE) and an equipment capability type of a base station;
determining whether the UE and the base station comprise at least one consistent service capability based on the service type of the UE and the equipment capability type of the base station;
in response to determining that the UE and the base station comprise at least one consistent service capability, establishing LIPA service for the UE; and
in response to determining that the UE and the base station do not comprise the at least one consistent service capability, determining whether to establish LIPA service for the UE according to a preserved strategy.

2. The method according to claim 1, wherein determining whether to establish LIPA service for the UE according to the preserved strategy comprises:
 selecting to not establish LIPA service for the UE according to the preserved strategy.

3. The method according to claim 1, wherein determining whether to establish LIPA service for the UE according to the preserved strategy comprises:
 if the service type of the UE is lower than the equipment capability type of the base station, establishing LIPA service matching with the service type of the UE for the UE on the basis of establishing process matching with the equipment capability type of the base station.

4. The method according to claim 1, wherein determining whether to establish LIPA service for the UE according to the preserved strategy comprises:
 if the service type of the UE is higher than the equipment capability type of base station, establishing LIPA service matching with the service type of the UE or the equipment capability type of the base station for the UE according to the preserved strategy.

5. The method according to claim 4, wherein establishing LIPA service matching with the service type of the UE for UE comprises establishing single tunnel of LIPA service for the UE.

6. The method according to claim 4, after establishing LIPA service matching with the equipment capability type of the base station for the UE, further comprising: marking a degradation of UE service type in a context information of the UE.

7. The method according to claim 4, wherein the establishing LIPA service matching with the equipment capability type of the base station for the UE further comprising:
 if the UE executes the handover, deactivating a bearer supporting LIPA service.

8. The method according to claim 1, wherein obtaining the service type of the UE comprises: in a mobile management entity (MME), receiving subscription information of the UE, and obtaining the service type of the UE according to the subscription information.

9. The method according to claim 8, wherein the subscription information of the UE includes information of the service with type of R10 LIPA or R11 LIPA supported by the UE;
 further comprising: saving, by the MME, the service type and an actual established service type of the UE.

10. The method according to claim 8, further comprising:
 in response to determining that the UE and the base station are inconsistent, notifying, by the MME, the base station of the service type of the UE.

11. The method according to claim 10, further comprising:
 in response to a handover request by the UE a determination is made whether to execute handover for the UE according to the service type of UE.

12. The method according to claim 1, wherein obtaining the equipment capability type of a base station comprising: in a mobile management entity (MME), receiving information that carries the equipment capability type of the base station from the base station, and obtaining the equipment capability type of the base station according to the received information.

13. The method according to claim 1, wherein obtaining service type of a UE comprises:
 in a mobile management entity (MME), receiving a subscription information of the UE, obtaining the service type of the UE according to the subscription information, and sending a message carrying the service type of the UE to the base station; and
 in the base station, obtaining the service type of the UE according to the message.

14. The method according to claim 1, further comprising:
 in response to a handover request by the UE,
 obtaining, by the MME, the service type of the UE and the equipment capability type of the base station;
 if the service type of the UE is a first LIPA, deactivating a bearer supporting LIPA service;
 if the service type of the UE is a second LIPA higher than the first LIPA, and the equipment capability type of base station is the second LIPA, executing the handover for the UE; and
 if the service type of the UE is the second LIPA, and the equipment capability type of base station is the first LIPA, determining whether to execute the handover for the UE according to the prescribed strategy.

15. In a wireless communication system capable of communicating between a user equipment (UE), a source base station, a target base station, and a mobile management entity (MME), a method to guarantee correct establishment of local IP access (LIPA) service in the MME if the UE is in a handover process, comprising:
 obtaining a service type of the UE and an equipment capability type of the target base station;
 determining whether the UE and the target base station comprise at least one consistent service capability based on the service type of the UE and the equipment capability type of the target base station; and
 selectively executing a handover process for the UE according to the whether the UE and the target base station comprise the at least one consistent service capability.

16. The method of claim 15, wherein selectively executing the handover process comprises:
 in response to determining that the UE and the target base station are consistent, executing the handover process based on the service type of the UE and a handover service type; and
 in response to determining that the UE and the target base station are inconsistent, executing the handover process according to a prescribed strategy.

17. The method of claim 16, wherein executing the handover process based on the service type of the UE and the handover service type comprises:
 if the service type of the UE is a first LIPA service and the handover service type is single bearer, determining that the handover process has failed and deactivating a bearer supporting LIPA service;
 if the service type of the UE is the first LIPA second and the handover service type is multiple bearers, deactivating the bearer supporting LIPA service and continuing the handover process; and
 if the service type of the UE and the equipment capability type of the target base station are a second LIPA service higher than the first LIPA service, executing the handover process.

18. The method of claim 16, wherein executing the handover process based on the service type of the UE and the handover service type comprises:
 if the service type of the UE is a first LIPA and the handover service type is single bearer, determining that the handover process has failed and activating bearer supporting LIPA service;
 if the service type of the UE is the first LIPA and the handover service type is multiple bearers, activating the bearer supporting LIPA service and continuing the handover process; and if the service type of the UE and the equipment capability type of the target base station are a second LIPA service higher than the first LIPA service, executing the handover process.

19. An apparatus to guarantee correct establishment of local IP access (LIPA) service in a mobile management entity (MME) of a wireless communication system having a user equipment (UE), a base station, and the MME, comprising:

the MME configured to:
- obtain a service type of the UE and an equipment capability type of the base station;
- determine whether the UE and the base station comprise at least one consistent service capability based on the service type of the UE and the equipment capability type of the base station;
- in response to determining that the UE and the base station comprise at least one consistent service capability, establish LIPA service for the UE; and
- in response to determining that the UE and the base station do not comprise the at least one consistent service capability, determine whether to establish LIPA service for the UE according to a preserved strategy.

20. The apparatus according to claim 19, wherein the MME is configured to determine whether to establish LIPA service for the UE according to the preserved strategy by selecting to not establish LIPA service for the UE according to the preserved strategy.

21. The apparatus according to claim 19, wherein the MME is configured to determine whether to establish LIPA service for the UE according to the preserved strategy by establishing LIPA service matching with the service type of the UE for the UE on the basis of an establishing process matching with the equipment capability type of the base station, if the service type of the UE is lower than the equipment capability type of the base station.

22. The apparatus according to claim 19, wherein the MME is configured to determine whether to establish LIPA service for the UE according to the preserved strategy by establishing LIPA service matching with the service type of the UE or the equipment capability type of the base station for the UE according to the preserved strategy, if the service type of the UE is higher than the equipment capability type of the base station.

* * * * *